United States Patent [19]
Resch

[11] 4,405,183
[45] Sep. 20, 1983

[54] VEHICLE BRAKE VALVE WITH AN EMERGENCY PISTON

[75] Inventor: Reinhard Resch, Stuttgart, Fed. Rep. of Germany

[73] Assignee: Daimler-Benz Aktiengesellschaft, Stuttgart, Fed. Rep. of Germany

[21] Appl. No.: 257,324

[22] Filed: Apr. 24, 1981

[30] Foreign Application Priority Data

Apr. 24, 1980 [DE] Fed. Rep. of Germany ....... 3015689

[51] Int. Cl.³ .......................... B60T 8/02; B60T 15/02
[52] U.S. Cl. ...................................... 303/119; 60/551; 60/563; 60/591; 303/52; 303/114; 303/6 R
[58] Field of Search ................. 303/6, 92, 52, 10–12, 303/113–119; 188/181, 345; 60/550, 551, 563, 564, 581, 582, 591

[56] References Cited

U.S. PATENT DOCUMENTS

| | | | |
|---|---|---|---|
| 3,918,765 | 11/1975 | Hayashida | 60/582 X |
| 3,979,153 | 9/1976 | Ingram et al. | 303/114 X |
| 4,197,710 | 4/1980 | Leiber | 60/582 X |
| 4,286,826 | 9/1981 | Leiber | 303/114 |

FOREIGN PATENT DOCUMENTS

2702819 7/1978 Fed. Rep. of Germany ...... 303/114

*Primary Examiner*—Douglas C. Butler
*Attorney, Agent, or Firm*—Craig & Burns

[57] ABSTRACT

A brake valve useable in conjunction with a vehicle braking system monitored by an anti-locking device and operable by a brake pedal through a trailing spring sometimes also called a simulating spring. The brake valve is provided with a control slide valve longitudinally displaceable by the trailing spring. The slide valve regulates a metered feed of the pressure medium conducted from a pressure source to the wheel brake cylinders. The pressure medium is relieveable at the wheel brake cylinders by anti-lock valves. The slide valve includes two control slide valves of which is associated with a pressure reservoir. One control slide valve cooperates with an emergency piston providing free through-flow during normal operation of the braking system. The emergency piston, upon a failure of the pressure medium source, after an emptying of the pressure reservoirs, is operable mechanically by the brake pedal after a spring-loaded ball valve has been closed at the emergency piston.

9 Claims, 1 Drawing Figure

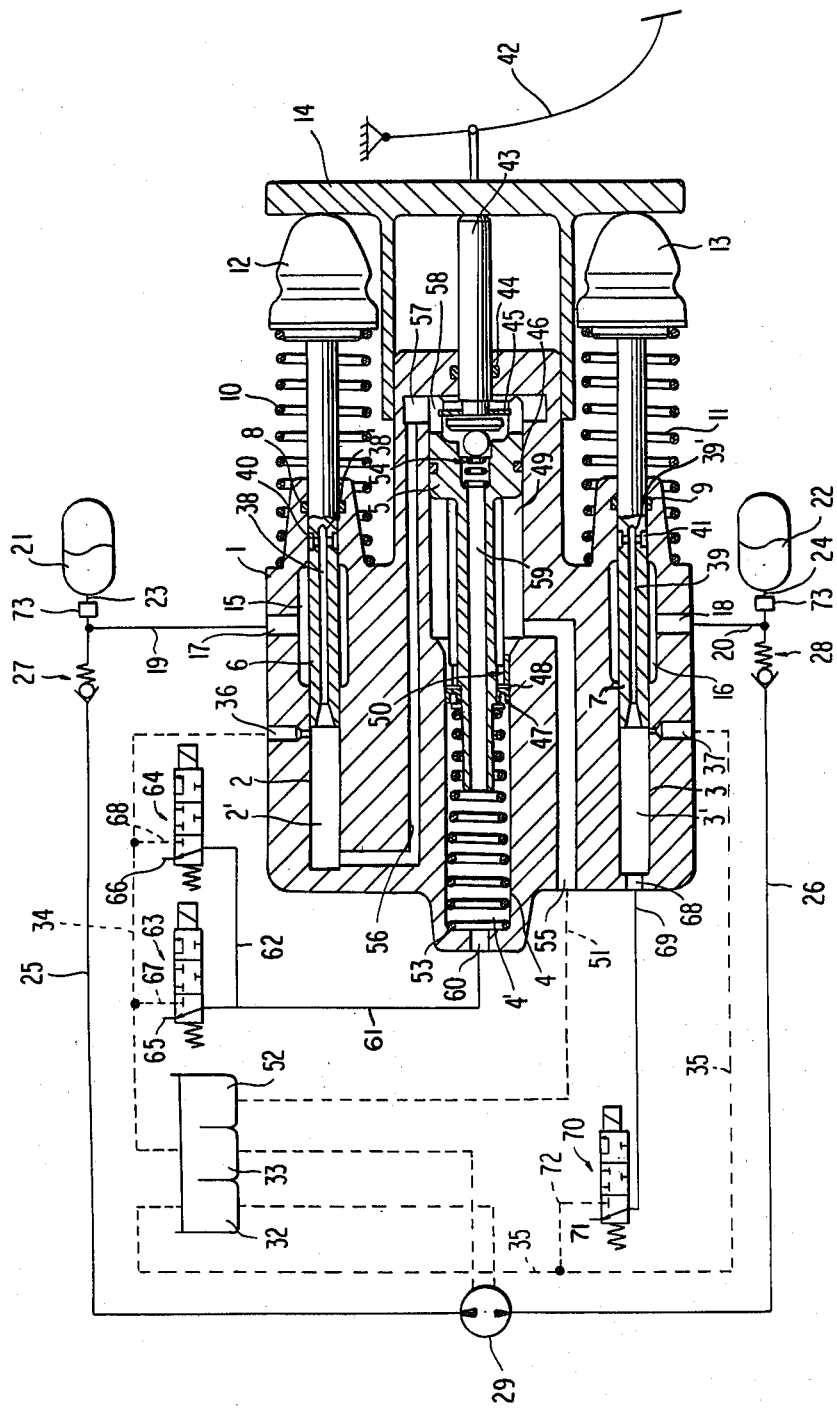

VEHICLE BRAKE VALVE WITH AN EMERGENCY PISTON

The present invention relates to a brake valve and, more particularly, to a brake valve which may be employed in conjunction with a vehicle braking system adapted to be monitored by an anti-locking device and to be operable by a brake pedal through a trailing or also called trailing spring or also called simulating spring. The brake valve is provided with a control slide valve longitudinally displaceable by the trailing spring. The slide valve regulates a metered feed of the pressure medium conducted from a pressure medium source to wheel brake cylinders. The pressure medium is relievable or bleedable at the wheel brake cylinders by means of anti-lock valves.

Brake valves with emergency pistons have been proposed wherein, in these brake valves, the emergency piston is arranged, in most cases, directly downstream of a brake valve tappet. As a result of this disposition of the emergency piston, a large idle or lost pedal travel occurs during a braking when the auxiliary energy has failed so that a relatively low braking pressure prevails. Moreover, such brake valves have considerable axial length so that the usefulness of such proposed brake valves in restricted insulation spaces is quite limited.

In German Offenlegungsschrift No. 2,702,819, a brake booster arrangement operating with a brake valve and two main pistons is proposed wherein a pressure medium coming from a storage means is not directly applied in a controlled fashion to the brake circuit but rather is applied to rear faces of the two main pistons separating the brake circuits from the storage circuit. A disadvantage of this proposed arrangement resides in the fact that in case of a locking tendency on a slippery or even icy roadway, the main pistons must be returned to their starting position in order to effect pressure reduction in the wheel brake cylinders.

The step of reducing the pressure which must be carried out on a slippery or icy roadway muct occur immediately so that locking of the wheel is prevented and two basic systems have been proposed by means of which a rapid pressure reduction may be achieved. In one proposed system, prior to a locking of the wheels, the pressure medium is drained directly through a valve from a brake circuit to a reservoir. In another proposed system, prior to a locking of the wheels, an increase in available space is provided by a displacement of a piston whereby a pressure drop occurs. These last two proposed systems are more responsive as compared to a drainage or bleeder valve approach due to the piston masses which are to be moved.

The aim underlying the present invention essentially resides in providing a brake valve with an integrated emergency piston which cooperates with an anti-locking device and is capable of producing acceptable emergency braking action in case of a failure of the pressure medium source.

Advantageously, in accordance with the present invention, two control slide valves are provided with each control slide valve being associated with a pressure reservoir and with a control slide valve cooperating with an emergency piston affording unhindered throughflow during normal operation. The emergency piston is mechanically operable by the brake pedal in case of a failure of the pressure medium source after the pressure reservoirs have been emptied and after a spring loaded ball valve at the emergency piston has been closed.

Advantageously, in order to obtain a compact construction of the total brake arrangement, in accordance with further features of the present invention, the emergency piston is arranged between the two control slide valves.

The emergency piston may, in accordance with the present invention, have a central longitudinal bore traversible by the pressure medium during normal operation, with the bore being sealed off in case of a disturbance in the pressure medium supply from the associated pressure revervoir by the force of a tappet connected through a yoke with the brake pedal, with the tappet then urging a spring loaded ball of the ball valve against the valve seat.

Advantageously, the emergency piston of the present invention is constructed as a stepped piston with a large piston surface and a smaller piston surface conveying, in an emergency operating, the operating pressure medium to the associated wheel brake cylinders. The emergency piston is urged by a compression spring into a starting position wherein a tappet presses through a yoke against the brake pedal.

It is possible in accordance with the present invention to connect anti-locking valves of one brake circuit to the pressure chamber of the emergency piston and to connect the anti-locking valve of the other brake circuit to the pressure chamber of one of the control slide valves. Advantageously, an appropriate monitoring arrangement may be provided for montioring the pressure reservoirs by, for example, a storage pressure sensor, with a signal of the storage pressure sensor being utilized for activating the anti-locking device or, during an emergency operation with the reservoirs empty, for a deactivation of the anti-locking device.

In accordance with the present invention, upon a failure of the pressure medium source, it is still possible to effectively brake after an emptying of the reservoirs with the aid of the emergency piston without having to pass through any appreciable idle travel path of the pedal. As compared with a solution not employing emergency pistons, by virtue of the features of the present invention, substantially smaller reservoirs may be employed.

A further advantage achieved by the utilization of a stepped piston for the emergency piston resides in the fact that the emergency piston, in case of an intact brake energy supply system, is hydraulically displaced after operation of the brake so that, depending upon a dimensioning of the stepped piston areas and of the piston restoring spring, the tappet connected to the emergency piston exerts no reactive force or only a small reactive force on the brake pedal. Back indication of the reactive force of the system pressure to the brake pedal takes place through the two control slide valves. Moreover, an anti-locking control with a directly draining or bleeding valve is advantageous.

Accordingly, it is an object of the present invention to provide a brake valve arrangement which may be used in conjunction with vehicle braking systems monitored by an anti-locking device which avoids, by simple means, shortcomings and disadvantages encountered in the prior art.

Another object of the present invention resides in providing a brake valve arrangement which has a relatively small longitudinal or axial dimension and is compact in a lateral direction.

Yet another object of the present invention resides in providing a brake valve arrangement which is capable of producing acceptable emergency braking in case of a failure of a pressure medium source.

A still further object of the present invention resides in providing a brake valve arrangement provided with pressure reservoirs which are of a relatively compact dimension.

Yet another object of the present invention resides in providing a brake valve arrangement which functions realiably under all operating conditions.

A still further object of the present invention resides in providing a brake valve arrangement which is simple in construction and therefore relatively inexpensive to manufacture.

These and other objects, features, and advantages of the present invention will become more apparent from the following description when taken in connection with the accompanying drawing which shows, for the purposes of illustration only, one embodiment in accordance with the present invention, and wherein:

The single FIGURE is a partially schematic cross sectional view of a brake valve useable in conjunction with a vehicle braking system monitored by an anti-locking device constructed in accordance with the present invention.

Referring now to the single FIGURE of the drawing, according to this figure, the brake valve includes a housing 1 provided with three bores 2, 3, 4 arranged parallel to one another with the bore 4 being disposed centrally and accommodating an emergency piston 5. Control slide valves 6, 7 respectively provided with gaskets or seals 8, 9 are respectively disposed in the two outer bores 2, 3. The control slide valves 6, 7 are urged by restoring springs 10, 11 and through travel simulating springs 12, 13 against a yoke 14.

Two annular chambers 15, 16 are disposed in the housing 1 and are in communication with accumulators or pressure reservoirs 21, 22 through bores 17, 18 and conduits 19, 20. The pressure reservoirs 21, 22 are supplied by a dual cycle pump 29 through conduits 25 and 26, check valves 27, 28 and conduits 23, 24. The dual cycle pump 29 is connected through intake lines 30, 31 to a multichamber tank 32, 33. A further communication is established between pressure chambers 3', 4', formed as a part of the bores 3, 4, with the multichamber tank 32, 33 through conduits 34, 35 and sealable bores 36, 37. Longitudinal bores 38, 39 are located in the control slide valves 6, 7, with the bores 38, 39 being in communication with annular chambers 40, 41 through transverse bores 38', 39'.

A brake pedal 42 acts through the yoke 14 on a tappet 43, with the tappet being sealed by a gasket or seal 44. A ring member 45 firmly links the tappet 43 to the emergency piston 5, which, in the illustrated embodiment, is constructed as a stepped piston and is provided with seals 46, 47 disposed at the respective steps of the piston.

A disk 48 contacts a rear side of the seal 47, with the disk 48 being adapted to seal off bores 50 leading to a secondary intake chamber 49. The secondary intake chamber 49 is connected through a duct 55 and a conduit 51 to a storage tank 52. A compression spring 53 is provided for urging the emergency piston 5 into its starting position. A spring loaded ball valve generally designated by the reference numeral 54 is disposed in the emergency piston 5 and cooperates with the tappet 43. A flow communication or flow path is provided between the pressure chamber 2', formed as a portion of the bore 2, and pressure chamber 4' through duct 56, annular chamber 57, groove 58, spring loaded ball valve 54, and central longitudinal bore 59.

Two anti-locking valves generally designated by the reference numerals 63, 64, of conventional construction, are connected to the pressure chamber 4' associated with a first brake circuit through a bore 60, and conduits 61, 62. The anti-locking valves 63, 64 are, in turn, connected throught conduits 65 and 66 with wheel brake cylinders of one brake circuit. Additionally, conduits 67 and 68 are in communication with a storage tank chamber 33 through a conduit 34.

The pressure chamber 3' of the bore 3 is associated with the second brake circuit, with the pressure chamber 3' being in communication with an anti-locking valve generally designated by the reference numeral 70 through a conduit 69. A conduit 71 extends or leads from the anti-locking valve 70 to wheel brake cylinders of the second brake circuit. A conduit 72 terminates in the conduit 35 connected to the storage tank chamber 32.

The two brake circuits of the overall brake system are formed in the following manner:

The first brake circuit emanates from the reservoir 21 and extends through conduits 23, 19, bores 17, annular chambers 15, 40, bores 38', 38, 2 and 56, chamber 57, groove 58, valve 54, bores 59, 60, conduit 61, 62, and the anti-locking valves 63, 64, to conduits 65, 66 which are connected to the wheel brake cylinders.

The second brake circuit emanates from the reservoir 22 and extends through conduits 24, 20, bore 18, annular chambers 16, 41, bores 39', 39, 3, and 68, conduit 69, and anti-locking device 70 to the conduit 71 which leads to the wheel brake cylinders of the second brake circuit.

The storage pressure in the pressure reservoirs 21, 22 is respectively monitored by a storage pressure sensor 73, of conventional construction, which is adapted to provide an output control signal which is concomitantly utilized for activation or deactivation of the anti-locking valves 63, 64, 70 in a conventional manner.

The operation of the overall brake system will be described in connection with two states of operation; namely, a braking operating with the overall system in tact, and a braking system with an inoperative pressure medium source and emptied reservoirs.

Upon an operation of the brake pedal 42 with the system in tact, the yoke 14 moves the control slide valves 6, 7 toward the left of the drawing by way of the trailing springs 12, 13 and thereby the reflex bores 36, 37 are first of all sealed off. If the brake pedal 42 is pivoted further, the annular chambers 15, 40 as well as 16 and 41 enter into mutual congruence, whereby pressure medium from the reservoirs 21, 22 flows to the wheel brake cylinders.

The pressure of the system acts through the control slide valves 6, 7 on the travel-simulating or trailing springs 12, 13 as well as through the yoke 14 on the brake pedal 42 and thus imparts a reactive feel to the operator. The tappet 43 does not act on the yoke 14 when the brake system is in tact since, in case of an operative system, the adjusted pressure urges the emergency piston 5 onto its left stop due to the pressure differential caused by the differing surfaces of the emergency piston 5, the tappet 43 being entraind during this step. A yoke trailing to a lesser extent, thus projects into empty space at the location of the emergency piston 5 and thereby the spring loaded ball 54 remains opened so that after a pressure drop in case of a danger of locking, a subsequent pressure build up is immediately made possible. During a retraction of the brake pedal, the reflux bores 36, 37 are open and the pressure of the system may be reduced by way of the conduits 34, 35.

With the braking being executed when the pressure medium sources are inoperative and the reservoirs 21, 22 being empty, during operation of the brake pedal 42, the tappet 43 is shifted through the yoke 14 toward the left as viewed in the drawing and thereby the spring loaded ball valve 54 closes and the emergency piston 5 urges the pressure medium enclosed in the pressure chamber 4' to the wheel brake cylinders of the first brake circuit. The control slide valves 6 and 7 are thus operated in the empty state. During a return of the emergency piston 5, the brake fluid may, if required, be replenished in the pressure chamber 4' from the storage tank 52 through the conduit 51, bore 55, auxiliary intake chamber 49, and bore 50.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A brake valve arrangement for a vehicle braking system operable by a brake pedal and monitored by an anti-locking means, the arrangement comprising a control valve means for metering a feed of pressure medium from a source of pressure medium to wheel brake cylinders of the braking system, the control valve means includes a first and second control slide valve, means are provided for respectively connecting the first and second control slide valves with separate pressure reservoir means forming the source of the pressure medium, an emergency piston means is cooperable with one of the control slide valves for enabling a free through-flow of pressure medium during a normal operation of the brake system, means are provided for blocking the through-flow of pressure medium upon a failure of the source of pressure medium and an emptying of the pressure reservoir means such that the emergency piston means is mechanically operable by the brake pedal, spring means are interposed between the brake pedal and first and second control slide valves, the anti-locking means includes anti-lock valves arranged at the wheel cylinders for relieving the pressure medium, the emergency piston means includes a longitudinally extending central bore through which the pressure medium flows during a normal operation of the brake system, the blocking means includes a spring loaded ball valve means for controlling an opening of the central bore, and a tappet means interposed between the brake pedal and ball valve means for urging the ball valve means into a closed position against a valve seat upon an interruption in a supply of pressure medium from the source of pressure medium, and the brake valve having an anti-locking mechanism that operates with pressure control at the wheel brakes by draining brake fluid from the wheel brake cylinders.

2. The brake valve arrangement according to claim 1, wherein the emergency piston means is arranged between the first and second control slide valves.

3. The brake valve arrangement according to claim 2 wherein the emergency piston means and first and second control slide valve are arranged in a housing so that a longitudinal center axis of the emergency piston means and a longitudinal center axis of each of first and second control slide valves are disposed substantially parallel to each other.

4. The brake valve arrangement according to claim 2, wherein the emergency piston means is constructed as a stepped piston, spring means are provided for normally urging the emergency piston means into a starting position, yoke means are arranged between the tappet means and the brake pedal, the emergency piston means presses against the brake pedal through the yoke means in the starting position, and means are provided for communicating a pressure chamber means associated with a small piston area of the stepped piston with the anti-locking means so as to enable a supply of pressure medium to the anti-locking means.

5. The brake valve arrangement according to claim 4, wherein means are provided for communicating a pressure chamber means associated with one of the control slide valves with the anti-lock means.

6. The brake valve arrangement according to claim 5, wherein means are provided for firmly connecting the tappet means to the emergency piston means.

7. The brake valve arrangement according to claim 2, wherein the brake system is a two circuit brake system, each of the circuits of the brake system includes the anti-locking valves, means are provided for communicating a pressure chamber means of the emergency piston means with the anti-locking valves of one of the two circuits, and means are provided for communicating a pressure chamber means of one of the control slide valves with the anti-locking valves of the other of the two circuits.

8. The brake valve arrangement according to claim 7, wherein means are provided for monitoring a storage pressure in the respective pressure reservoir means and for providing a control signal for activating and deactivating the anti-locking means.

9. The brake valve arrangement according to claim 8, wherein means are provided for firmly connecting the tappet means to the emergency piston means.

* * * * *